United States Patent
Issaev et al.

(10) Patent No.: US 8,119,286 B2
(45) Date of Patent: *Feb. 21, 2012

(54) ELECTROCHEMICAL CELLS WITH IMPROVED SEPARATOR AND ELECTROLYTE

(75) Inventors: Nikolai Nikolaevich Issaev, Woodbridge, CT (US); Michael Pozin, Brookfield, CT (US); Michael Dean Sliger, New Milford, CT (US); Eric Navok, Stamford, CT (US); Fred Joseph Berkowitz, New Milford, CT (US)

(73) Assignee: The Gillette Company, Boston, MA (US)

( * ) Notice: Subject to any disclaimer, the term of this patent is extended or adjusted under 35 U.S.C. 154(b) by 94 days.

This patent is subject to a terminal disclaimer.

(21) Appl. No.: 12/624,662

(22) Filed: Nov. 24, 2009

(65) Prior Publication Data

US 2011/0123874 A1    May 26, 2011

(51) Int. Cl.
*H01M 4/36*    (2006.01)

(52) U.S. Cl. ............... 429/221; 429/231.95; 429/231.1; 429/329; 429/333; 429/335; 429/337

(58) Field of Classification Search .................. 429/221, 429/231.95, 231.1, 329, 333, 335, 337
See application file for complete search history.

(56) References Cited

U.S. PATENT DOCUMENTS

| | | | |
|---|---|---|---|
| 4,238,554 A | 12/1980 | Barrella | |
| 4,482,615 A | 11/1984 | Rosansky et al. | |
| 4,654,280 A | 3/1987 | Bailey | |
| 4,808,497 A | 2/1989 | Blomgren et al. | |
| 4,952,330 A | 8/1990 | Leger et al. | |
| 5,219,683 A | 6/1993 | Webber | |
| 5,290,414 A | 3/1994 | Marple | |
| 5,458,997 A | 10/1995 | Crespi et al. | |
| 5,514,491 A | 5/1996 | Webber | |
| 5,691,083 A | 11/1997 | Bolster | |
| 6,171,729 B1 | 1/2001 | Gan et al. | |
| 6,218,054 B1 | 4/2001 | Webber | |
| 6,300,004 B1 | 10/2001 | Tucholski | |
| 6,627,353 B1 | 9/2003 | Munshi | |
| 6,670,073 B2 | 12/2003 | Tucholski et al. | |
| RE38,518 E | 5/2004 | Tucholski | |
| 6,730,136 B2 | 5/2004 | Webber | |
| 6,849,360 B2 | 2/2005 | Marple | |
| 7,157,185 B2 | 1/2007 | Marple | |
| 7,722,988 B2 * | 5/2010 | Webber | ............. 429/221 |
| 2003/0070283 A1 | 4/2003 | Webber | |
| 2004/0029007 A1 | 2/2004 | Kusumoto et al. | |
| 2005/0095508 A1 | 5/2005 | Yamamoto | |
| 2005/0112462 A1 | 5/2005 | Marple | |
| 2005/0233214 A1 | 10/2005 | Marple et al. | |
| 2005/0277023 A1 | 12/2005 | Marple et al. | |
| 2006/0046152 A1 | 3/2006 | Webber | |
| 2006/0046153 A1 | 3/2006 | Webber | |
| 2006/0046154 A1 | 3/2006 | Webber et al. | |
| 2009/0208849 A1 | 8/2009 | Pozin et al. | |

FOREIGN PATENT DOCUMENTS

| | | |
|---|---|---|
| CN | 1645651 A | 7/2005 |
| CN | 1845364 A | 10/2006 |
| JP | 2006-100164 | 4/2006 |
| JP | 2007042447 A | 2/2007 |
| JP | 2007052935 A | 3/2007 |
| WO | WO 2009/129213 A1 | 10/2009 |

OTHER PUBLICATIONS

PCT International Search Report with Written Opinion in corresponding Int'l appln. PCT/US2010/056792 dated Jan. 25, 2011.
U.S. Appl. No. 12/624,670, filed Nov. 24, 2009, Nikolai N. Issaev et al.

* cited by examiner

*Primary Examiner* — Laura Weiner
(74) *Attorney, Agent, or Firm* — Kevin C. Johnson; Steven W. Miller

(57) ABSTRACT

An electrochemical cell is described. The electrochemical cell includes an anode, a cathode, a separator between said anode and said cathode, and an electrolyte. The electrolyte includes a salt dissolved in an organic solvent. The separator in combination with the electrolyte has an area specific resistance less than 2 ohm-cm$^2$.

13 Claims, 1 Drawing Sheet

ELECTROCHEMICAL CELLS WITH IMPROVED SEPARATOR AND ELECTROLYTE

FIELD OF THE INVENTION

The invention relates to an electrochemical cell and more particularly to an electrochemical cell including an improved separator and electrolyte combination.

BACKGROUND OF THE INVENTION

The development of high energy battery systems requires the compatibility of an electrolyte possessing desirable electrochemical properties with highly reactive, high energy density anode and cathode materials, such as lithium, sodium, $FeS_2$ and the like.

While the theoretical energy, i.e. the electrical energy potentially available from a selected anode-cathode couple is relatively easy to calculate, there is a need to choose an electrolyte for such couple that permits the actual energy produced by an assembled battery to approach the theoretical energy. The problem usually encountered is that it is practically impossible to predict in advance how well, if at all, an electrolyte will function with a selected couple. Although a cell must be considered as a unit having three parts, a cathode, an anode and an electrolyte, and it is to be understood that the parts of one cell are not predictably interchangeable with parts of another cell to produce an efficient and workable cell. It has been realized that the separator, in conjunction with the electrolyte, can play an important part in the performance characteristics of a cell.

Many electrochemical systems can function in various environments when they are freshly produced. However, when cell systems are stored for long periods of time at high temperatures, their impedance characteristics can become altered to render the electrochemical systems unsuitable for some consumer applications. A specific high rate application of a cell is its use in cameras. Although cells can function under normal conditions, many cells may exhibit high voltage drop under high drain rates as exemplified in flash cameras.

There exists a need to provide an electrolyte solution and separator combination for use in an electrochemical cell to provide lower overall cell impedance to substantially increase cell performance.

SUMMARY OF THE INVENTION

One aspect of the invention features an electrochemical cell. The electrochemical cell comprises an anode, a cathode, a separator between the anode and cathode, and an electrolyte. The cathode comprises iron disulfide. The electrolyte comprises a salt dissolved in an organic solvent. The separator in combination with the electrolyte has an area specific resistance less than 2 ohm-cm$^2$.

In some implementations, the separator may have a pore size between about 0.005 to about 5 micron. The separator may have a tortuosity less than about 2.5. The separator may have a porosity between about 30% and about 70%. The electrolyte may comprise a plurality of salts dissolved in an organic solvent. The organic solvent may comprise an ether-based solvent. The organic solvent may comprise a mixture of a cyclic ether-based solvent and an acyclic ether-based solvent. The cyclic ether-based solvent may comprise a dioxolane. The weight ratio of the acyclic ether-based solvent to the dioxolane may be from 1:99 to 45:55. The weight ratio of the acyclic ether-based solvent to the dioxolane may further be from 10:90 to 40:60. The acyclic ether-based solvent may be selected from the group consisting of dimethoxyethane, ethyl glyme, diglyme, dimethoxypropane, and triglyme. The acyclic ether-based solvent may be 1,2-dimethoxyethane. At least one co-solvent may be included in the electrolyte solvent. The co-solvent may be present in an amount less than 25 weight percent based on the weight of the solvent of the electrolyte solution. The co-solvent may be selected from the group consisting of 3,5-dimethylisoxazole, 3-methyl-2-oxazolidone, propylene carbonate, ethylene carbonate, butylene carbonate and sulfolane. The anode may comprise lithium. The separator may be wetted by the electrolyte. The separator may have a thickness from about 8 to about 30 micrometers.

BRIEF DESCRIPTION OF THE DRAWINGS

While the specification concludes with claims particularly pointing out and distinctly claiming the subject matter which is regarded as forming the present invention, it is believed that the invention will be better understood from the following description taken in conjunction with the accompanying drawings.

DETAILED DESCRIPTION OF THE INVENTION

Figure 1:
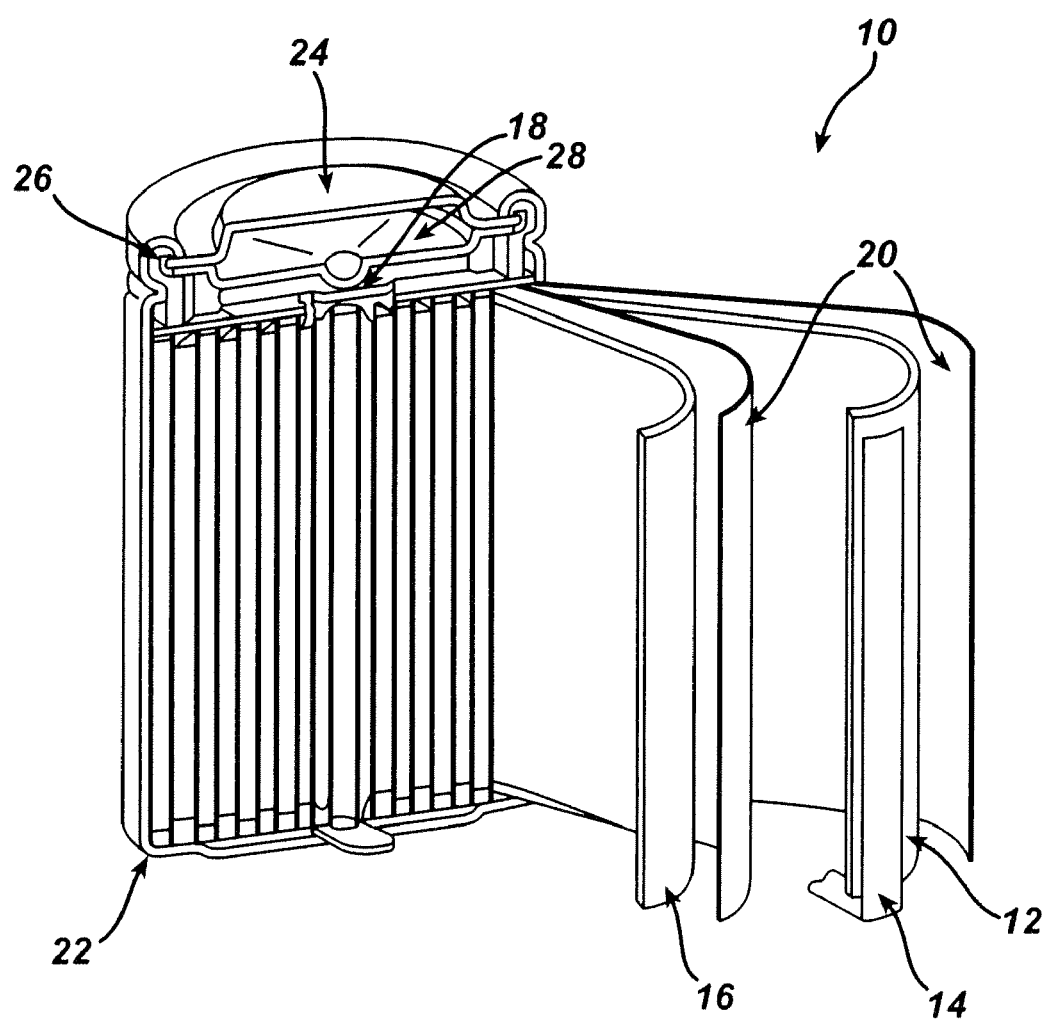
FIG. 1 is a pictorial view of a cylindrical Li/FeS$_2$ cell.

Referring to FIG. 1, a primary electrochemical cell 10 includes an anode 12 that comprises lithium in electrical contact with a negative lead 14, a cathode 16 that comprises iron disulfide in electrical contact with a positive lead 18, a separator 20, and an electrolyte. Anode 12 and cathode 16, with separator 20 disposed therebetween, may be rolled into an assembly typically referred to as a jelly roll. Anode 12, cathode 16, separator 20, and the electrolyte are contained within a housing 22. Electrochemical cell 10 further includes a cap 24 and an annular insulating gasket 26. The cell 10 may include a safety valve 28. The cathode 16 preferably comprises a blend of iron disulfide, conductive carbon particles, and binder.

The electrolyte comprises a salt dissolved in an organic solvent. A salt may comprise one salt or may comprise a plurality of salts. The organic solvent may comprise an ether-based solvent. The organic solvent may comprise a mixture of ether-based solvents. The organic solvent may comprise a mixture of a cyclic ether-based solvent and an acyclic ether-based solvent. The cyclic ether-based solvent may comprise a dioxolane. As used herein the term dioxolane shall mean 1,3-dioxolane (DIOX), alkyl-substituted dioxolanes or mixtures thereof. Examples of alkyl-substituted dioxolanes are 4-methyl-1,3-dioxolane or 2,2-dimethyl-1,3-dioxolane. A preferred dioxolane for use in this invention is 1,3-dioxolane. Typical acyclic ether-based solvents suitable for use in this invention are dimethoxyethane, 1,2-dimethoxyethane (DME), ethyl glyme, diglyme, dimethoxypropane, and triglyme. The organic solvent may comprise an organic carbonate. The organic solvent may comprise a mixture of organic carbonates. Examples of organic carbonates include ethylene carbonate (EC), propylene carbonate (PC), dimethyl carbonate (DC), ethyl methyl dicarbonate (EMC), diethyl carbonate (DEC), and vinylene carbonate (VC).

For some applications, at least one optional co-solvent may be used such as 3,5-dimethylisoxazole (DMI), 3-methyl-2-oxazolidone (3Me2Ox), propylene carbonate (PC), ethylene carbonate (EC), butylene carbonate (BC), tetrahydrofuran (THF), diethyl carbonate (DEC), ethylene glycol sulfite (EGS), dioxane, dimethyl sulfite (DMS), gamma butyrolactone (GBL), or the like. The preferred co-solvents for use in this invention are 3,5-dimethylisoxazole, 3-methyl-2-oxazolidone and propylene carbonate. For most applications the addition of the optional co-solvent should be limited to 25 weight percent or less based on the total weight of the solvent for the electrolyte, preferably less than 20 weight percent.

The preferred weight ratio of the acyclic ether-based solvent to dioxolane is from 1:99 to 45:55, more preferably from 10:90 to 40:60 and one of the most preferred is about 29:71. The most preferred electrolyte is 29.0 weight percent DME, 70.8 weight percent DIOX, 0.2 weight percent DMI, and 0.1 weight percent of LiTFS along with 1.0 moles LiI per liter of solution.

It has been found that in addition to the electrolyte a low resistance separator allows for optimal high rate cell performance. A desired separator material for use in high rate lithium cells comprises microporous extruded or cast films (membranes). The separator may have a thickness from about 8 to 30 micrometers (microns). The microporous membrane separator may have a pore size range from about 0.005 to about 5 microns and preferably from about 0.005 to about 0.3 microns, a porosity range from about 30 to about 70 percent, preferably from about 35 to about 65 percent, an area specific resistance measured in combination with the electrolyte of less than 2 ohm-cm$^2$, and a tortuosity of less than about 2.5.

The pore size of the separator may be above a minimum value which enables the nonhindered migration of a solvated ion. A solvated lithium ion may be on the order of 10 Angstroms or 0.001 micron. Since it may be common for organic electrolyte systems to form ion pairs and for at least a monolayer of an electrolyte solvent to line the pore walls of the separator, a minimum pore diameter of 0.005 micron enables the nonimpeded passage of an ion through a pore. As the pore size increases, however, nonporous areas need to also increase in order to provide mechanical strength. The result of increasing these nonporous areas may be blockage of a substantial portion of the separator impeding ion migration. As a result, a large number of moderate size pores may be preferred to a few very large pores. Another way of viewing this effect is that the distance between pores may be as important as the pore diameter. Typically, in separators of submicron size, the distance between pores should also be less than a micron. In addition, it is also a function of the separator to form a physical barrier to the passage of electrode particles through the separator which could result in an electrical short between the anode and cathode. Such particles can be as small as a few microns, thus also limiting the upper desired pore diameter. Consequently the pore size may preferably be in the submicron range or the pores should be sufficiently tortuous to provide a physical barrier to the passage of electrode particles through the separator.

Methods for determining pore size of a porous material are liquid displacement and air flow measurements. These measurements can be performed using a commercial instrument such as the Coulter II Porometer. The Coulter II Porometer determines the pressure required to overcome the surface tension of a liquid within a wetted pore. The smaller the pore, the greater the pressure required. By comparing the pressure profile of a wetted membrane to a dry membrane, a pore diameter distribution can be determined. Pore diameters represent mean pore flow diameters, that is, half of the flow passes through pores larger than this value and half flows through pores smaller than this diameter.

A minimum porosity of 35% may typically be utilized to provide moderate ion transport. Porosities greater than 70% typically may result in insufficient tensile strength for processing into an electrochemical cell and the need for thicker than desired separators. Preferred separator porosities may be between about 35% and about 65%.

Area specific resistance is a measured combination separator and electrolyte property which is influenced by other properties such as pore size, number of pores, porosity, tortuosity and wettability. The area specific resistance value may be the best parameter which can be correlated to electrochemical cell rate capability. In the case of lithium cells having organic electrolytes and solid cathodes it has been found that the most preferred area specific resistance value for high rate performance should be less than 2 ohm-cm$^2$. Separator and electrolyte area specific resistance above 2 ohm-cm$^2$ hinders the rate performance capability of the cell.

Tortuosity in its simplest definition is the ratio of actual pore length, i.e., how far an ion has to travel to pass through a separator, to the separator thickness. However this definition assumes that mass transport through a pore is affected only by distance and does not take other hindrances to mass transport into account. Such hindrances include: pore bottle necks or pore restrictions, noninterconnected pores or dead ends, inhibited ion flow as ions collide with pore side walls at channel bends. Since no model accurately describes the tortuosity of a separator and since the tortuosity of each separator is different, the best indication of separator tortuosity is that estimated from the measured resistance value in electrolyte. The most common method of determining the effective tortuosity of a separator is based on the separator porosity and the ratio of specific conductivity of the separator to that of the electrolyte. Thus, $$\frac{R_{separator}}{R_{solution}} = \frac{Tortuosity^2}{Porosity}$$

where $R_{separator}$ is the area specific resistance in ohms-cm$^2$ of the separator, $R_{solution}$ is the area specific resistance in ohms-cm$^2$ of the electrolyte and porosity in volume fraction. Although this equation assumes all pores have identical tortuosities, it is accurate for defining the separator of this invention. It has been found that the best high rate separators exhibit tortuosities of less than 2.5 and preferably less than 2.0. A study of commercial separators suggest that high tortuosity may not be so much a result of actual tortuous paths but rather a result of regions of pore blockage. That is, many separators display layered regions of high and low porosity. If the regions of low porosity limit ion transport, the result is a higher resistance value which is reflected in a higher tortuosity value. F. L. Tye described in the Journal of Power Sources Vol. 9 (1983), 89-100, a theoretical calculation of the contribution that pores of varying tortuosities have on overall separator conductivity. Based on this treatment, if a separator contained 50% of its pores at a tortuosity of 1.5 and 50% of its pores at a tortuosity of 4, 88% of the conductivity is a result of the pores at a tortuosity of 1.5. This theoretical treatment of pore structure and separator conductivity supports the observations of measured separator resistances. However in reality, a measured resistance and estimated tortuosity do not provide any insight as to whether all the pores have equal tortuosity or if only a small portion of the current is being carried through a few pores of low tortuosity. Different cell performances would be expected based on the distribution of pore tortuosities.

Another category of separators produced from microfibers, such as by melt blown nonwoven film technology, may also be useful. Such films typically possess pores of several microns in diameter but displaying less tortuous paths.

Preferably the separator comprises a material that is wettable or wetted by the electrolyte. A material is said to be wetted by a liquid when the contact angle between the liquid and the surface is less than 90° or when the liquid will tend to spread spontaneously across the surface; both conditions normally coexist.

Material for anode 12 may comprise aluminum (Al), lithium (Li), sodium (Na), potassium (K), calcium (Ca), magnesium (Mg) and their alloys and metal-intercalated carbon or graphite material such as lithiated carbon. Of these metals, lithium is preferred because, in addition to being a ductile, soft metal that can easily formed into a jelly roll and used in the assembly of a cell, it possesses the highest energy-to-weight ratio of the group of suitable anode metals.

Material for cathode 14 may comprise fluorinated carbon represented by the formula $(CF_x)_n$ wherein x varies between about 0.5 and about 1.2 and $(C_2F)_n$ wherein in both cathodes the n refers to the number of monomer units which can vary widely, copper sulfide (CuS), copper oxide (CuO), lead dioxide ($PbO_2$), iron sulfides (FeS, $FeS_2$), copper chloride ($CuCl_2$), silver chloride (AgCl), silver oxide (AgO, $Ag_2O$), sulfur (S), bismuth trioxide ($Bi_2O_3$), copper bismuth oxide ($CuBi_2O_4$), cobalt oxides, vanadium pentoxide ($V_2O_5$), tungsten trioxide ($WO_3$), molybdenum trioxide ($MoO_3$), molybdenum disulfide ($MoS_2$), titanium disulfide ($TiS_2$), transition metal polysulfides, lithiated metal oxides and sulfides, such as lithiated cobalt and/or nickel oxides, lithiated manganese oxides, $Li_xTiS_2$, $Li_xFeS_2$, $Li_4Ti_5O_{12}$, $LiFePO_4$, $LiFeNbPO_4$ and mixtures thereof.

The jelly roll assembly comprising anode 12 and cathode 16 with separator 20 therebetween may be prepared by spirally winding flat electrodes with separator material. Anode 12 may be prepared from a solid sheet of lithium metal as the anode active material, e.g., a continuous sheet of lithium metal or lithium alloy, such as a lithium-aluminum alloy. Cathode 16 may comprise a cathode active material, such as iron disulfide ($FeS_2$), coated onto metallic substrate, such as a sheet, grid, or screen comprising aluminum or stainless steel. Separator 20 comprises electrolyte permeable material, such as microporous polypropylene or polyethylene.

To fabricate a jelly roll assembly, separator 20 may be inserted on each side of the anode 12. The first (top) separator sheet can be designated the outer separator sheet and the second sheet can be designated the inner separator sheet. The cathode 16 may then placed against the inner separator sheet to form the flat electrode assembly. The anode and cathode may be aligned in any arrangement, but generally the smaller, in surface area, of the electrodes is aligned so that its total surface area has an opposing electrode with separator therebetween. The flat electrode assembly may be spirally wound to form an electrode spiral assembly, or jelly roll assembly. The winding can be accomplished using a mandrel to grip an extended separator edge of the flat electrode assembly and then spirally winding the flat electrode assembly to form the wound electrode assembly. The winding may occur either clockwise or counter-clockwise depending on the electrode desired by design to be at the jelly roll's outermost radius, e.g., the anode at the outermost radius of the jelly that is generally referred to as an anode outer-wrap design or the cathode at the outermost radius of the jelly that is generally referred to as an cathode outer-wrap design. The finished jelly roll may have either the anode or cathode located towards its outermost radius.

The ionizable salt for use in this invention may be a simple salt such as $LiCF_3SO_3$ or lithium bistrifluoromethylsulfonyl imide ($Li(CF_3SO_2)_2N$) or a double salt or mixtures thereof which will produce an ionically conductive solution when dissolved in these solvents. Suitable salts are complexes of inorganic or organic Lewis acids and inorganic ionizable salts. One of the requirements for utility is that the salts, whether simple or complex, be compatible with the solvent(s) being employed and that they yield a solution which is sufficiently ionically conductive, e.g., at least about $10^{-4}$ ohm$^{-1}$ cm$^{-1}$. Generally, an amount of at least about 0.5M (moles/liter) would be sufficient for most cell applications.

Useful ionizable salts include lithium fluoride, lithium chloride, lithium bromide, lithium sulfide, LiTFS, LiI, LiTFSI, $LiBF_4$, $LiPF_6$, $LiAsF_6$, LiBOB, $Li(CF_3SO_2)_2N$, $Li(CF_3SO_2)_3C$, sodium bromide, potassium bromide, lithium bromide, and mixtures thereof.

The ionizable salt for use in conjunction with iron sulfide-containing cathodes can include lithium trifluoromethane sulfonate ($LiCF_3SO_3$), lithium bistrifluoromethylsulfonyl imide ($Li(CF_3SO_2)_2N$), lithium perchlorate ($LiClO_4$), lithium hexafluoroarsenate ($LiAsF_6$) or mixtures thereof with lithium trifluoromethane sulfonate being the most preferred. Suitable double salts for various cell applications would be lithium tetrafluoroborate ($LiBF_4$), and lithium hexafluorophosphate ($LiPF_6$).

Experimental Testing

Resistance measurements are conducted in a resistivity cell. The resistivity cell consists of two stainless steel electrodes encased in Teflon®. The lower electrode is constructed such that a small reservoir of electrolyte may be maintained in the cell. The top electrode assembly is removable and is aligned to the bottom assembly via two metal pins. The top electrode assembly is spring loaded so that that force may be applied (approximately 4 to 5 lbs.) to the top of a material sample being analyzed. The lower electrode assembly is screwed to a fixture base and electrical leads are attached to each electrode. The leads are then attached to the leads of an impedance analyzer, such as a Solartron Impedance Analyzer, that is used to complete impedance sweeps to determine resistances of the cell or sample materials.

The background resistance of the resistivity cell is determined by running an impedance sweep on the fixture filled with electrolyte when its electrodes are shorted. The sweep starts at 100,000 kHz and finishes at 100 Hz using a 10 mV amplitude, using the software program ZPlot by Scribner Instruments to control the instrumentation. The resistance of the fixture ($R_{CELL}$) may have typical values between about 10 and 150 mΩ depending upon the condition of the stainless steel electrodes. Several sweeps may be completed to ensure the value obtained is relatively constant.

The resistance of the separator and electrolyte combination is determined by running an impedance sweep on a separator sample. The fixture includes a center disk upon which the separator sample may be placed. Electrolyte is placed within the cavity of the resistivity cell to a level that ensures the separator sample is well-wetted on both sides. The same impedance sweep as described above is run. Again, several sweeps may be completed to ensure the value obtained is relatively consistent. The data obtained from the sweeps is plotted on a Nyquist plot. The ohmic resistance ($R_{REAL}$) of the separator and electrolyte combination is determined at the Z"=0 point on the Nyquist plot. However, this value includes the resistance of the resistivity cell. By subtracting the resistance value of the resistivity cell ($R_{CELL}$) from the resistance determined for the separator and electrolyte combination sample that includes resistivity cell impedance ($R_{REAL}$), the adjusted resistance value for the separator and electrolyte combination [$R_{REAL}(ADJ)$] is calculated.

The area specific resistance (ASR) of the separator and electrolyte combination is determined by multiplying the geometrical surface area of the resistivity cell's working electrode by the adjusted separator and electrolyte combination resistance value. The working electrode surface area of resistivity cell used in these experiments had been 3.829 cm². The units of ASR are Ω·cm².

The combinations of two separators with three different electrolytes are screened for inclusion within assembled cells for discharge testing.

Separator 1—Celgard 2400, a microporous polypropylene monolayer membrane with a thickness of 25 μm and a porosity of 41%.

Separator 2—Celgard 2500, a microporous polypropylene monolayer membrane with a thickness of 25 μm and a porosity of 55%.

Electrolyte A—0.8M LiTFSI in a mixture of 80% by volume dioxolane and 20% by volume sulfolane with 1000 ppm of added pyridine and 150 ppm of added water.

Electrolyte B—1.5M LiTFS in a mixture of 25% by volume dioxolane and 75% by volume DME.

Electrolyte C—1.0M LiI, 0.1% by weight LiTFS, and 2000 ppm of DMI in a mixture of 70% by weight dioxolane and 30% by weight DME with 200 ppm of added water.

The impedance of the resistivity cell is first determined with each specific electrolyte as described above. The impedance of the separator/electrolyte combination is then determined with each specific electrolyte. The adjusted separator/electrolyte combination resistance is then determined and used in the calculation of the ASR. The results are included within Table 1. The separator/electrolyte combinations that have lower ASR's provide lower overall cell impedance and potentially improved overall cell discharge performance.

TABLE 1

Area Specific Resistance (ASR) for separator/electrolyte combinations.

| SEPARATOR | ELECTRO-LYTE | $R_{CELL}$ (Ω) | $R_{REAL}$ (Ω) | $R_{REAL}$ (ADJ) (Ω) | ASR (Ω·cm²) |
|---|---|---|---|---|---|
| 1 | A | 0.163 | 0.835 | 0.672 | 2.573 |
| 1 | B | 0.112 | 1.686 | 1.574 | 6.028 |
| 1 | C | 0.118 | 1.013 | 0.895 | 3.426 |
| 2 | A | 0.163 | 0.454 | 0.291 | 1.113 |
| 2 | B | 0.112 | 0.837 | 0.725 | 2.775 |
| 2 | C | 0.118 | 0.566 | 0.448 | 1.716 |

Discharge performance testing follows an ANSI protocol commonly referred to as the digital camera test, or Digicam. The protocol consists of applying pulsed discharge cycles to the cell. Each cycle consists of both a 1.5 Watt pulse for 2 seconds followed immediately by a 0.65 Watt pulse for 28 seconds. After 10 consecutive pulses, the cell is then allowed to rest for a period of 55 minutes, after which the prescribed pulse regime is commenced for a second cycle. Cycles continue to repeat until a cutoff voltage of 1.05 V is reached. The total number of 1.5 Watt pulses required to reach the cutoff voltage is recorded.

A cell is assembled that includes the combination of Separator 2 and Electrolyte A with an ASR of 1.113 Ω·cm². After ambient storage followed by a pre-discharge of 3% cell capacity, Digicam testing is performed on the cell. The cell may exhibit an average of 592 pulses, an improvement of about 6% versus a cell that includes a separator/electrolyte combination that has an ASR of greater than 2 Ω·cm².

A cell is assembled that includes the combination of Separator 2 and Electrolyte C with an ASR of 1.716 Ω·cm². After ambient storage followed by a pre-discharge of 3% cell capacity, Digicam testing is performed on the cell. The cell may exhibit an average of 638 pulses, an improvement of about 2% versus a cell that includes a separator/electrolyte combination that has an ASR of greater than 2 Ω·cm².

TABLE 2

Digicam Performance Testing for selected separator/electrolyte combinations.

| SEPARATOR | ELECTROLYTE | PERFORMANCE (Pulses) |
|---|---|---|
| 1 | A | 559 |
| 2 | A | 592 |
| 1 | C | 624 |
| 2 | C | 638 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An electrochemical cell comprising an anode, a cathode, a separator between said anode and said cathode, and an electrolyte, said cathode comprising iron disulfide, said electrolyte comprising a salt dissolved in an organic solvent, said organic solvent comprising a mixture of a cyclic ether-based solvent and an acyclic ether-based solvent, and said separator in combination with said electrolyte has an area specific resistance less than 2 ohm-cm².

2. The electrochemical cell of claim 1 wherein the separator has a pore size between about 0.005 to about 5 micron.

3. The electrochemical cell of claim 1 wherein the separator has a tortuosity less than about 2.5.

4. The electrochemical cell of claim 1 wherein the separator has a porosity between about 30% and about 70%.

5. The electrochemical cell of claim 1 wherein the electrolyte comprises a plurality of salts dissolved in the organic solvent.

6. The electrochemical cell of claim 1 wherein the cyclic ether-based solvent comprises a dioxolane.

7. The electrochemical of claim 6 wherein the weight ratio of the acyclic ether-based solvent to the dioxolane is from 1:99 to 45:55.

8. The electrochemical cell of claim 7 wherein the weight ratio of the acyclic ether-based solvent to the dioxolane is from 10:90 to 40:60.

9. The electrochemical cell of claim 1 wherein the acyclic ether-based solvent is selected from the group consisting of dimethoxyethane, ethyl glyme, diglyme, dimethoxypropane, and triglyme.

10. The electrochemical cell of claim 9 wherein the acyclic ether-based solvent is 1,2-dimethoxyethane.

11. The electrochemical cell of claim 1 wherein the anode comprises lithium.

12. The electrochemical cell of claim 1 wherein the separator is wetted by the electrolyte.

13. The electrochemical cell of claim 1 wherein the separator has a thickness from about 8 to about 30 micrometers.

* * * * *